Nov. 6, 1928.  
F. O. MARSHALL  
1,690,453  
BELTING  
Filed May 2, 1925

Inventor  
Frank O. Marshall.

By Cheever + Cox  
Attys.

Patented Nov. 6, 1928.

1,690,453

UNITED STATES PATENT OFFICE.

FRANK O. MARSHALL, OF CHICAGO, ILLINOIS.

BELTING.

Application filed May 2, 1925. Serial No. 27,356.

My invention relates to belting and the method of producing same, and the object of the invention is to provide means for increasing the life of the article with little increase in cost and without increasing the resistance to flexure. Another object is to produce the desired result without preventing the belt from flexing transversely at the central portion, thus enabling the belt to conform to the crowning of the pulley. Still another object is to provide a construction which will prevent fraying of the belt at the edges. A further object is to provide means for preventing the belt from climbing the flange of the pulley with which it cooperates.

I obtain my objects by the construction illustrated in the accompanying drawings in which Figure 1 is a perspective view of a portion of belting embodying my invention. One part of the belt is left uncemented and unstapled to shown one of the possible constructions, viz in which the belting is folded at the edges, thus producing a finished edge in distinction to a raw edge, as would be the case if the different plies were made of separate individual layers.

Like numerals denote like parts througout the several views.

Figure 1:
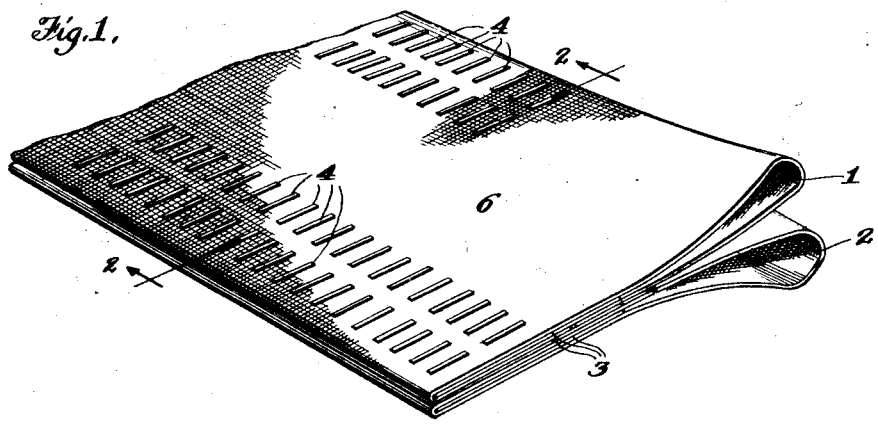
Figure 2:
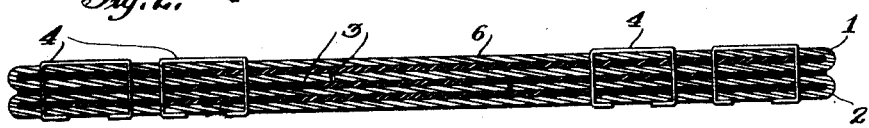
Figure 2 is a transverse sectional view on the line 2—2 Figure 1.
Figure 3:
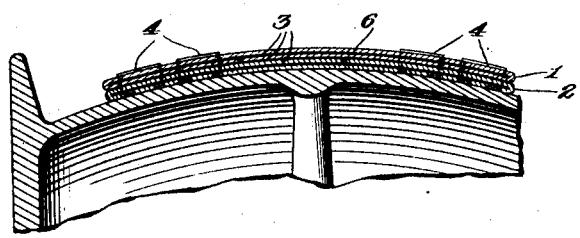
Figure 3 is a transverse sectional view of the belting showing the same in position upon the flange of the pulley. The view shows a fragment of the pulley on a diametral plane—that is, the plane in which the axis of the pulley lies.

In the form selected to show one type of belting in which invention may be incorporated, the belting is four ply and is composed of two folded sheets 1, 2 of duck or other woven fabric. These sheets or strips are folded edge to edge, and then laid one upon the other in the manner shown. By preference the parts are so arranged that the meeting edges of one strip will be offset from the meeting edges of the other strip, and all of the meeting edges will come on the inside of the belting so that the belting shall present a smooth and continuous outer surface on both sides. The manner of folding is not essential, however, and may be varied.

Between the different layers of fabric are intervening layers 3 of flexible cement or adhesive. While I do not wish to confine myself to any specific type of adhesive, I have found that balata gum has the necessary and desirable characteristics. The parts are consolidated, usually by heat and pressure, so that the fabric is more or less impregnated with the adhesive and a unitary structure is produced.

In addition to the adhesive I apply staples or stitching 4. These fastening devices, which I shall term "staples" are of wire and are clenched on the opposite face of the structure. The staples run crosswise of the belt and in the form illustrated are arranged in two rows parallel to each other and parallel and adjacent to the edges of the belt. Of course the number of longitudinal rows of staples may be varied in accordance with the width of the belt, but for the sake of illustration it may be said that a belt having a width of five inches may be provided with staples approximately a half an inch long and so arranged that there is a space 6 of two inches at the center of the belt which is unstapled. In the form illustrated the staples in a given longitudinal row are spaced closer togther than the length of a staple. Furthermore the staples are comparatively rigid so as to oppose any sharp transverse flexure of the belt at the edges.

While my belting may be used for various purposes, it is especially useful where there is an unusual degree of wear and tear, for example, axle driven car lighting systems. It will be understood that in one well-known type of car lighting system there is an electric generator mounted upon the car body and this is driven from a pulley mounted on one of the axles of the car. In this situation the belt is not only subjected to great variations in rate of speed, but is also constantly subjected to the action of dirt and grit, which is fanned up from the road bed, and is also subjected to great changes of temperature, from the hot days of summer to the cold days of winter. More important still, however, is the fact that in going around curves the axle changes its direction relatively to the car body and hence the axis of the driving pulley does not remain parallel to the axis of the driven pulley. This has been the source of much trouble and expense in axle-driven car-lighting systems. The curves are frequently sharp and cause a pronounced variation from parallelism between the axes of the two pulleys and this creates a strong tendency for the belt to "flange", that is, to ride up upon the flange of one or both of the pulleys. This frequently causes the belt to be thrown off, and invariably causes very rapid wear at the edges. When my belt is employed the life of the belt is greatly prolonged, in fact is practically doubled. It is my understanding that these advantages result largely from the fact that the marginal row of staples prevent transverse bending of the belt at the edges with the result that the belt cannot start to creep up the side of the flange. In other words, my belt is so stiff at the edges that it remains approximately flat and hence maintains itself in contact with the crowned surface of the pulley and is prevented from creeping up the side of the flange. This has the double advantage of keeping the belt on the pulley and preventing the belt from being unduly stretched and frayed at the edges. It is at the edges of the ordinary belting where the wear is greatest, and by largely eliminating the wear at this point the life of the belt is greatly increased. I believe also that the increase in durability is due partly to the cooperation of the staples with the adhesive to prevent the friction of one lamination or ply upon its fellows. This reduces the amount of "working" of one thread upon another in the same ply and to a greater extent the surface friction of one ply against the adjacent one. The stitching or staples have the additional function of helping the adhesive to hold the laminations or plies together. Furthermore, the heat of summer, together with that resulting from internal friction of the belt, tends to soften the adhesive to such an extent that it will be forced out from the laminations and lost. With a belt stapled like mine the staples cooperate with the adhesive and permanently hold the structure in single unitary and consolidated form. Furthermore the staples themselves, being metallic, reduce the amount of wear due to contact with the pulleys, and this also tends to prolong the life of the belt.

As the midwidth portion of the belt is free from staples, the belt is transversely flexible, and readily conforms to the transverse curvature or crowning of the pulley.

Having thus described my invention what I claim as new and desire to secure by Letters Patent is:

1. A belt of the following proportions and construction; the same being formed of multi-ply gum impregnated fabric approximately five inches in width and formed with a longitudinally extending unstitched center of about two inches in width, there being on each side of such center wire stitches each about one half inch in length arranged in two longitudinally and transversely extending spaced apart rows, the outermost row being spaced from the edge and the stitches in said rows being spaced apart longitudinally slightly less than the length of a stitch.

2. A belt formed of flexible material, provided with relatively long and narrow and substantially rigid stiffening elements, said elements being disposed in parallel spaced apart rows extending both longitudinally and transversely of the belt said rows being sufficiently spaced apart longitudinally of the belt to permit the same to freely flex in the longitudinal direction, and said transverse rows being disposed transversely of the belt to prevent the opposed longitudinal marginal areas from flexing in a transverse direction while permitting the belt to flex intermediate said marginal areas in a transverse direction to conform to the crown of a pulley when applied thereto.

3. A belt composed of folded layers of woven fabric arranged with the closed folds of the tubes at the longitudinal margins of the belt, and said fabric being impregnated with flexible gum, said belt being stiffened transversely but not longitudinally by wire stitches, said stitches being disposed along the longitudinal margins of the belt but spaced from the edges so as to leave said edges free, and said stitches lying in both longitudinal and transversely extending parallel rows spaced apart both longitudinally and transversely of the belt, the length and rigidity of the stitches at the margins holding such portions from flexing transversely.

4. A belt of flexible material stiffened transversely along its longitudinal edges by transverse parallel rows of wire stitching, said rows being parallel and spaced sufficiently apart longitudinally of the belt so as to preserve the longitudinal flexibility of the belt and said transverse rows being constructed and arranged to permit the belt to flex across its intermediate width to conform to a crowned pulley when applied thereto while preventing the longitudinal marginal portions of the belt from flexing transversely.

5. A belt composed of multi-ply fabric impregnated with gum and provided with tow longitudinal rows of relatively long and narrow and substantially rigid stiffening elements adjacent each longitudinal edge of the belt, the elements of each row lying transverse of the belt and being parallel and spaced apart longitudinally slightly less than the length of an element.

6. A belt consisting of a strip of woven fabric impregnated with flexible gum and provided with wire staples arranged in rows adjacent to the edge of the belt with the staples running transversely thereto and spaced at sufficient intervals to preserve the longitudinal flexibility of the belt while also imparting a transverse stiffness to the belt, said staples being forced through the fabric after the manner of wire stitching thereby avoiding the cutting away of the fibers of the fabric.

In witness whereof, I have hereunto subscribed my name.

FRANK O. MARSHALL.